United States Patent
Do

(10) Patent No.: US 6,729,427 B1
(45) Date of Patent: May 4, 2004

(54) LOCKING STATE DETECTING APPARATUS OF VEHICLE'S BUCKLE

(75) Inventor: Heon-jeong Do, Seoul (KR)

(73) Assignee: Delphi Automotive Systems Sungwoo Corporation, Seoul (KR)

(*) Notice: Subject to any disclaimer, the term of this patent is extended or adjusted under 35 U.S.C. 154(b) by 0 days.

(21) Appl. No.: 09/506,247

(22) Filed: Feb. 17, 2000

(30) Foreign Application Priority Data

Aug. 23, 1999 (KR) .......................................... 1999-35044

(51) Int. Cl.[7] .............................................. B60R 22/48
(52) U.S. Cl. ..................... 180/268; 307/10.1; 340/457.1
(58) Field of Search ................................. 180/268, 269, 180/270; 24/633; 340/457.1; 307/10.1

(56) References Cited

U.S. PATENT DOCUMENTS

| | | | |
|---|---|---|---|
| 5,109,199 A | * | 4/1992 | Berger ...................... 200/61.58 |
| 5,590,904 A | * | 1/1997 | Ellis et al. ................... 180/268 |
| 5,742,986 A | | 4/1998 | Corrion et al. |
| 5,883,441 A | * | 3/1999 | Shoemaker ......... 180340/457.1 |
| 5,944,135 A | * | 8/1999 | Blackburn et al. .......... 180/268 |
| 5,970,587 A | * | 10/1999 | Knox ........................... 24/633 |
| 5,982,048 A | * | 11/1999 | Fendt et al. ................. 180/268 |

FOREIGN PATENT DOCUMENTS

| | | | |
|---|---|---|---|
| EP | 0 893 314 A2 | | 1/1999 |
| JP | 01207081 A | * | 8/1989 ........... A62B/35/00 |

* cited by examiner

Primary Examiner—Peter C. English
(74) Attorney, Agent, or Firm—Fish & Richardson P.C.

(57) ABSTRACT

A locking state detecting apparatus of a buckle includes a hall sensor, a switching element, and resistors. Operation of the hall sensor is based on the locking state of the buckle. The operating state of the hall sensor affects the operating state of the switching element, which in turn affects voltage values that fall across the resistors. An electronic control unit senses the voltage values across the resistors to determine the operating state of the hall sensor and detects the locking state of the buckle.

8 Claims, 7 Drawing Sheets

LOCKING STATE DETECTING APPARATUS OF VEHICLE'S BUCKLE

BACKGROUND OF INVENTION

This invention relates to an apparatus for detecting the operating state of a vehicle and providing the detected signal to an electronic control unit (ECU) for controlling the operation of a vehicle, and more particularly, to providing an apparatus for detecting the locking state of a buckle and generating a detected signal to facilitate the control of the operation of the vehicle.

PRIOR ART

A seat belt apparatus mounted in a vehicle is generally used to protect a driver and/or a passenger in colliding (or clashing) accidents. The seat belt apparatus includes a buckle fixed through a cable to one surface of a floor panel, and a retractor fixed to the lower portion of a center pillar with a seat belt being wound thereon. A tongue is hung at a predetermined position of the seat belt to couple with the buckle. A guider prevents twisting of seat belt when the belt is released or retreated. An anchor is used to adjust the height of the seat belt.

FIG. 1 shows a switching circuit provided with a conventional micro-switch SW1 which is mounted on the buckle to make a driver recognize the fact of whether he or a passenger wears a seat belt. The switching circuit controls the application of a power source VCC through a resistor R4 to a warning light WL mounted on an instrument panel. The warning light WL is turned on or off depending on whether the micro-switch is turned on or off, which in turn depends on the insertion of the tongue into the buckle. If the driver or the passenger occupies the seat without wearing the seat belt, the micro-switch SW1 is turned on and the warning light WL warns the driver that he is not wearing the seat belt. If the tongue is inserted into the buckle to fasten the seat belt, the micro-switch SW1 is turned off and the warning light WL is turned off to indicate that the driver is wearing the seat belt.

The switch device has a simple configuration to control the operation of the warning light mounted on the instrument panel according to the fastening or unfastening of the buckle without including any connection with a control system of a vehicle. Under such design, the control system cannot recognize the abnormal state or operation state of the vehicle. This is undesirable in view of the advancements in intelligent and automated control systems. Therefore, it is preferable if the control of all warning lights on the instrument panel is carried out by an electronic control unit (ECU) to enhance the efficiency of the vehicle control.

The switching device may cause a high voltage to discharge through the circuit in a short period of time when the switching circuit is opened or closed by the mechanical contact of the micro-switch upon the fastening or unfastening of the seat belt. This induces electromagnetic interference (EMI) that may cause damage to the ECU.

SUMMARY OF THE INVENTION

Accordingly, in order to resolve these disadvantages and problems, an object of the invention is to provide a locking state detecting apparatus of a seat belt buckle to enable an electronic control unit (ECU) to self-diagnose the control system of a vehicle.

Another object of the invention is to provide a locking state detecting apparatus of a seat belt buckle for detecting the locking state of the buckle and enabling other safety units, such as an airbag system, to cooperate with the buckle to enter a waiting mode. The safety units, such as the airbag system, can be quickly triggered into operation.

Another object of the invention is to provide a locking state detecting apparatus of a seat belt buckle for enabling a micro-stitch to detect the locking state of the buckle and to use an electronic control unit (ECU) of a vehicle control system to supply a detection signal.

Therefore, the invention is adapted to a vehicle control system for detecting an abnormal state of the vehicle, and for triggering the airbag system into operation when an abnormal state of the vehicle is detected.

In order to accomplish these objects, the invention comprises a locking state detecting apparatus of a buckle for enabling a warning light provided in an instrument panel to confirm the matter of fastening the seat belt through the turning on or off of a micro-switch, in which the buckle further comprises an electronic switch for recognizing its locking state and generating the detected signal.

In one implementation, the locking state detecting apparatus includes a micro-switch and an electronic switch assembly mounted in a buckle to cooperate with a tongue for enabling an electronic control unit (ECU) to generate a signal for the locking state of the buckle. The electronic switch assembly includes a hall sensor assembly to detect the locking state of the buckle, and a first switching element (e.g., a transistor) to turn on or off a warning light to indicate whether the seat belt is fastened. A second switching device (e.g., a transistor) is connected to the ECU through a first control resistor. The second switching device is connected to the first switching device through a second control resistor. A control voltage determined by a power supply and the hall sensor assembly is applied to the second switching device to control its operation. Depending on the operation state of the hall sensor assembly and the second switching element, the ECU can sense different amounts of resistance connected between a terminal of the ECU and ground, thereby sensing the locking state of the buckle.

In another implementation, the locking state detecting apparatus comprises a hall sensor assembly without a micro-switch. The electronic control unit ECU is connected to a switching element and a first resistor to recognize the voltage value formed by the first resistor, when the hall sensor assembly is operated. A control resistor is provided having a larger resistance value than the first resistor. The ECU identifies the voltage value formed by both the control resistor and the first resistor when the hall sensor assembly is deenergized.

In one aspect the invention features an apparatus that includes detecting means for detecting whether a seatbelt buckle is in a locked state or in an unlocked state, and a signal generating means for generating an electronic signal that can be measured by an electronic control unit of a vehicle in response to the detecting means detecting that the seatbelt buckle is in the locked state.

Implementations of the invention may include one or more of the following features.

The signal generating means includes a transistor having a first terminal, a second terminal, and a third terminal, the first terminal being electrically coupled to a first resistor, the second terminal being electrically coupled to a second resistor, and the third terminal being electrically coupled to the detecting means.

In another aspect, the invention features an apparatus that includes a seatbelt buckle, a hall sensor mounted in the buckle, and a first electronic switching device that is electrically coupled to the hall sensor.

Implementation of the invention may include one or more of the following features.

The hall sensor is responsive to a position of a tongue relative to the buckle.

The first electronic switching device includes a transistor.

The apparatus also includes a first resistor and a second resistor, the first resistor being electrically coupled to a first terminal of the first electronic switching device, the second resistor being electrically coupled to a second terminal of the first electronic switching device.

The first resistor is also electrically coupled to an electronic control unit of a vehicle.

The second resistor is also electrically coupled to a second electronic switching device.

The second electronic switching device is electrically coupled to a light emitting device.

The hall sensor includes a first terminal and a second terminal, the first terminal of the hall sensor electrically coupled to a supply voltage through a resistor, and the second terminal of the hall sensor electrically coupled to ground.

The first electronic switching device is electrically coupled to the light emitting device.

The first electronic switching device is electrically coupled to the electronic control unit through the first resistor.

In another aspect, the invention features an apparatus that includes a hall sensor mounted in a seatbelt buckle, a first electronic switching device that is electrically coupled to a first terminal of the hall sensor, and a second electronic switching device that is electrically coupled to a second terminal of the hall sensor.

Implementation of the invention may include one or more of the following features.

The first electronic switching device has a first terminal and a second terminal, the first terminal being electrically couple to a first terminal of a first resistor, the second terminal being electrically coupled to a first terminal of a second resistor.

The second electronic switching device includes a first terminal and a second terminal, the first terminal of the second electronic switching device being electrically coupled to the second terminal of the first electronic switching device, and the second terminal of the second electronic switching device being electrically coupled to ground.

Alternatively, the second electronic switching device includes a first terminal and a second terminal, the first terminal of the second electronic switching device being electrically coupled to the second resistor, and the second terminal of the second electronic switching device being electrically coupled to ground.

The apparatus also includes an electronic control unit of a vehicle that is electrically coupled to a second terminal of the first resistor.

A second terminal of the second resistor is electrically coupled to ground.

The hall sensor, the first electronic switching device, and the second electronic switching device are configured so that a voltage at the second terminal of the first resistor changes in response to a change in an output of the hall sensor.

The second electronic switching device comprises a field effect transistor (FET).

The hall sensor is responsive to a position of a tongue relative to the buckle.

BRIEF DESCRIPTION OF THE DRAWINGS

The invention now will be described in detail with reference to the accompanying drawings in which.

DETAILED DESCRIPTION OF THE INVENTION

Figure 1:
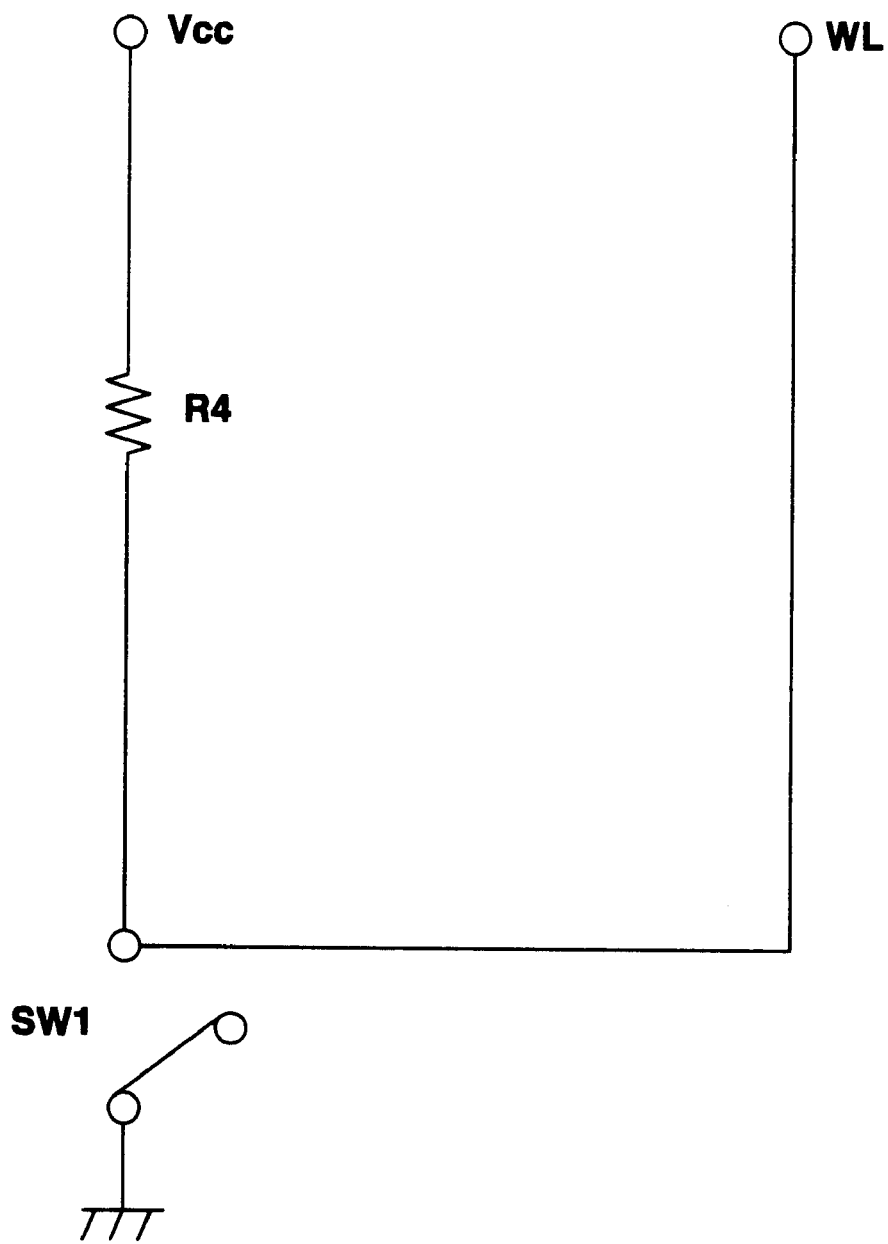
FIG. 1 is a circuit containing a micro-switch of a prior art.
Figure 2:
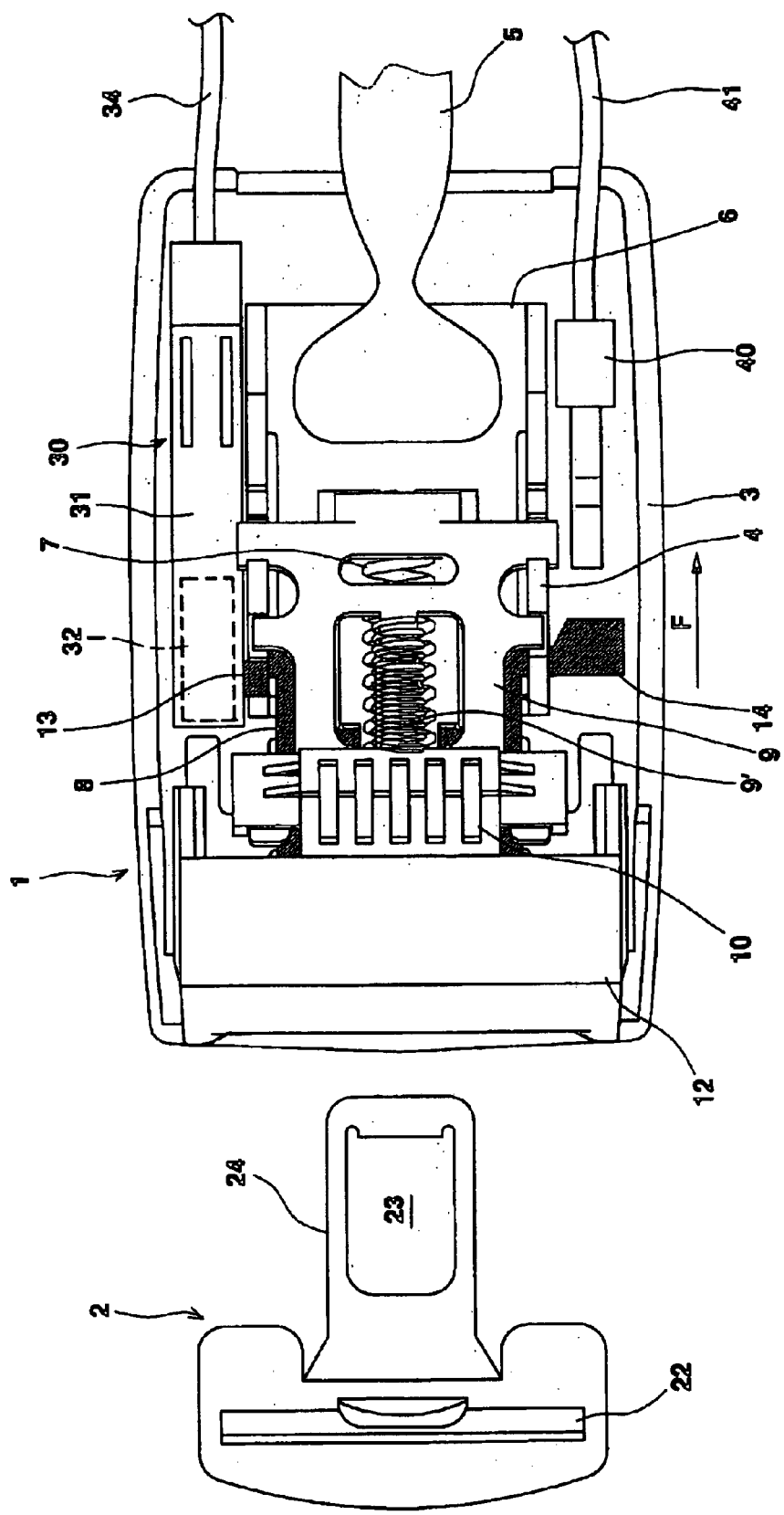
FIG. 2 is an upper cross-sectional view showing the non-operating state of a micro-switch and a hall sensor assembly before the insertion of a tongue into a buckle.
Figure 3:
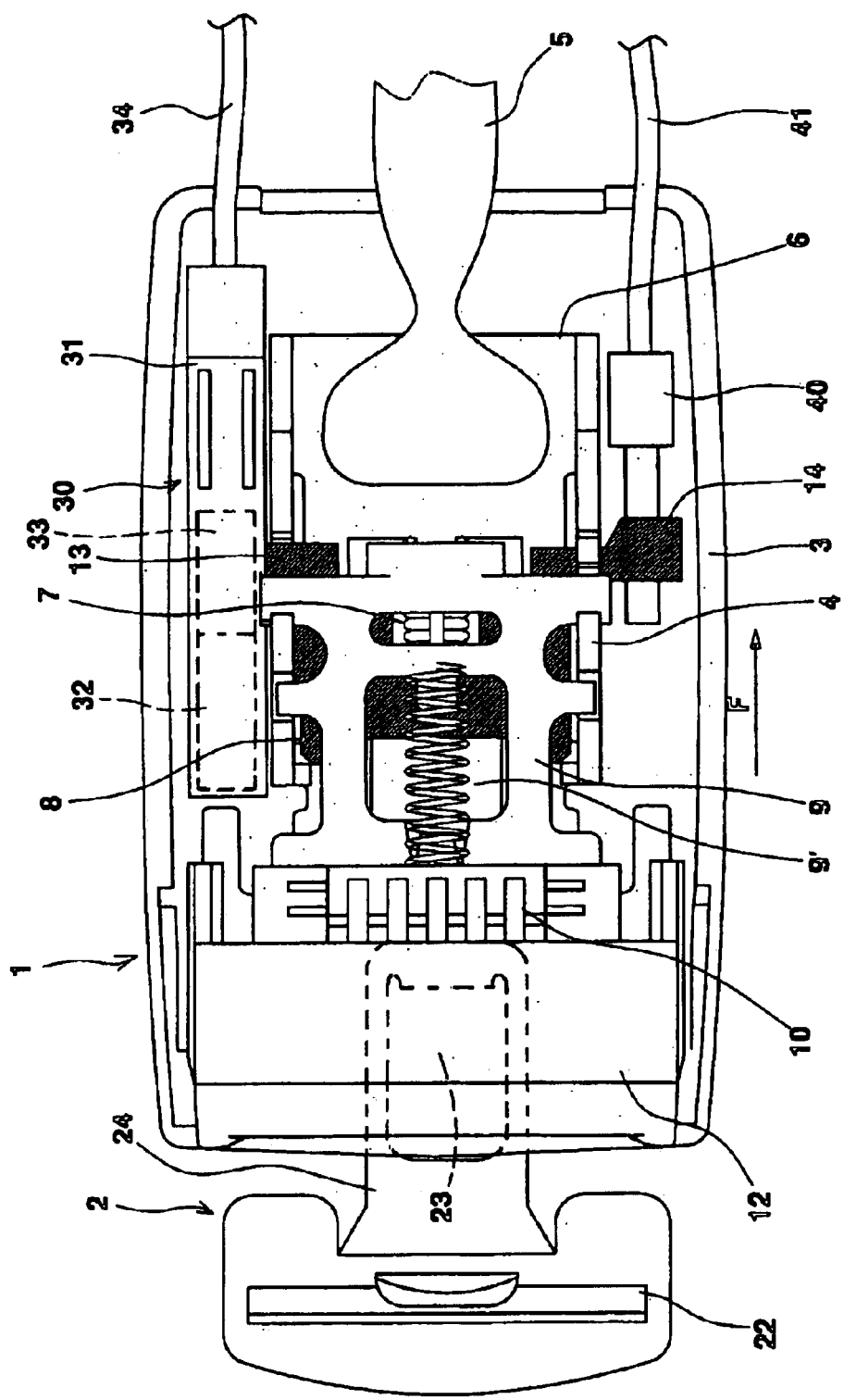
FIG. 3 is an upper cross-sectional view showing the operating state of the micro-switch and the hall sensor assembly before the insertion of the tongue into the buckle.

Referring to FIGS. 2 and 3, a buckle assembly includes a buckle 1 and a tongue 2. The buckle 1 is constructed to prevent the escape of the tongue 2 when inserted into a housing 3. A frame 4 is properly positioned in the housing 3 in a manner such that a supporter 6 is fixed to the rear end of the housing 3 and connected to a fixing member 5. The fixing member 5 is coupled with the inner portion of a vehicle.

An ejector 8 is inserted into the lower portion of the frame 4, which is supported by a spring 7 in a hole (not shown). The ejector 8 is moved rearward in an arrow direction F when the tongue 2 is inserted into the buckle 1. A latch 9 is positioned on the upper portion of the frame 4. A block 10 is mounted on the front end of the latch 9 so as to be elastically supported by a spring 9' and cooperated with a button 12. The latch 9 is moved upward to hold the tongue 2 in a fixed position when the tongue 2 is inserted into the buckle 1. The latch 9 is moved downward to release the tongue 2 when the tongue 2 is withdrawn from the buckle 1. Further, the ejector 8 includes extending portions 13 and 14 projecting from opposite sides of the frame 4. The projecting portions 13 and 14 slide relative to the frame 4.

A micro-switch 40 and a hall sensor assembly 30 are properly arranged adjacent to opposite sides of the frame 4. The micro-switch 40 includes a cable 41 which may be selectively connected to the electronic control unit or to a warning light and a power source. The tongue 2 includes a hole 22 formed at a rear portion; the hole 22 is designed to be coupled with a web (not shown in the figure). Tongue 2 also includes an inserting portion 24 at a front portion, which is inserted into buckle 1. The inserting portion 24 has a hole 23 formed to be locked with the latch 9.

Figure 4:
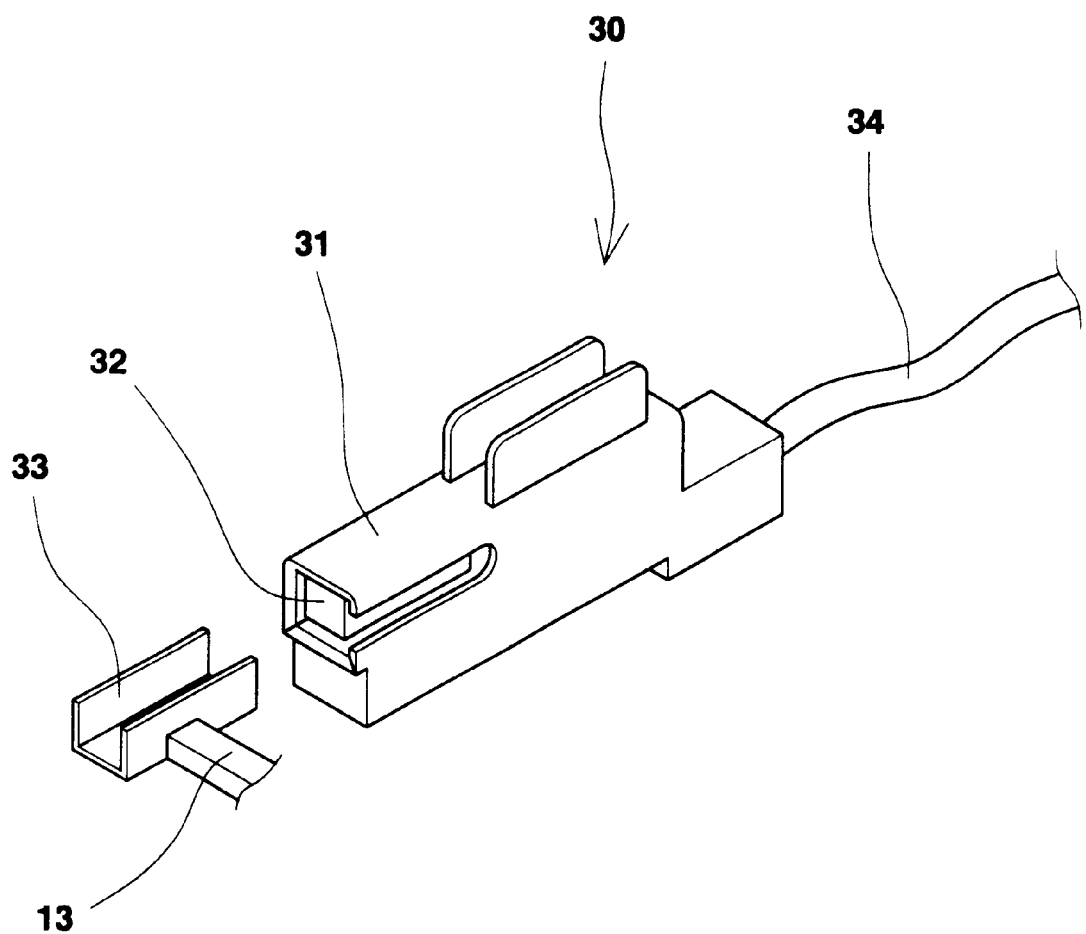
FIG. 4 is a perspective view illustrating the operating state of the hall sensor assembly.

Referring to FIG. 4, the hall sensor assembly 30 includes a body 31 properly mounted adjacent to one side of the frame 4. A hall sensor and a printed circuit board constitute a part of a detecting circuit for detecting the locking state of the buckle 1. The detecting circuit detects the locking state of the tongue 2 and provides a detected signal to the electronic control unit. Herein, it is noted that the hall sensor includes a permanent magnet 32 and a hall effect member arranged to face the permanent magnet 32. For the purpose of simplifying the explanation of the detecting circuit, the hall effect member hereinafter is referred to as a hall sensor 35.

An U-shaped slider 33 connected to the extending portion 13 of the ejector 8 is arranged in the body 31 to surround the lower portion of the permanent magnet 32. The U-shaped slider 33 is slidably movable along with the ejector 8, which includes the extending portion 13.

The hall sensor assembly 30 is positioned adjacent to the frame 4 as shown in FIGS. 2 and 3. A cable 34 is connected to the electronic control unit and the power source for the hall sensor 35 and the detecting circuit (not shown).

When the inserting portion 24 of the tongue 2 is inserted into a hole of the frame 4 in the buckle 1, the ejector 8 is moved in a direction as shown by an arrow F. Then, the latch 9 is moved upward along with the block 10 to cause its lower end to be inserted in the hole 23 of the insertion portion 24, thereby coupling the tongue 2 with the buckle 1. At the same time, the extending portion 13 is arranged to move along with the ejector 8 so that the U-shaped slider 33 surrounding the lower portion of the permanent magnet 32 is moved into the body 31. In this way, the hall sensor 35 directly faces the permanent magnet 32 in order to be energized. At the same time, the extending portion 14 turns off the micro-switch 40 (referring to FIG. 5).

Thereafter, as the button 12 is pressed, the block 10 is moved rearward, while the latch 9 is moved downward to be returned to the original position. This allows the tongue 2 to be freely withdrawn out of the buckle 1. At that time, the U-shaped slider 33 interrupts or separates the hall sensor 35 from the permanent magnet 32 to deenergize the hall sensor assembly 30. The extending portion 14 turns on the micro-switch 40.

Figure 5:
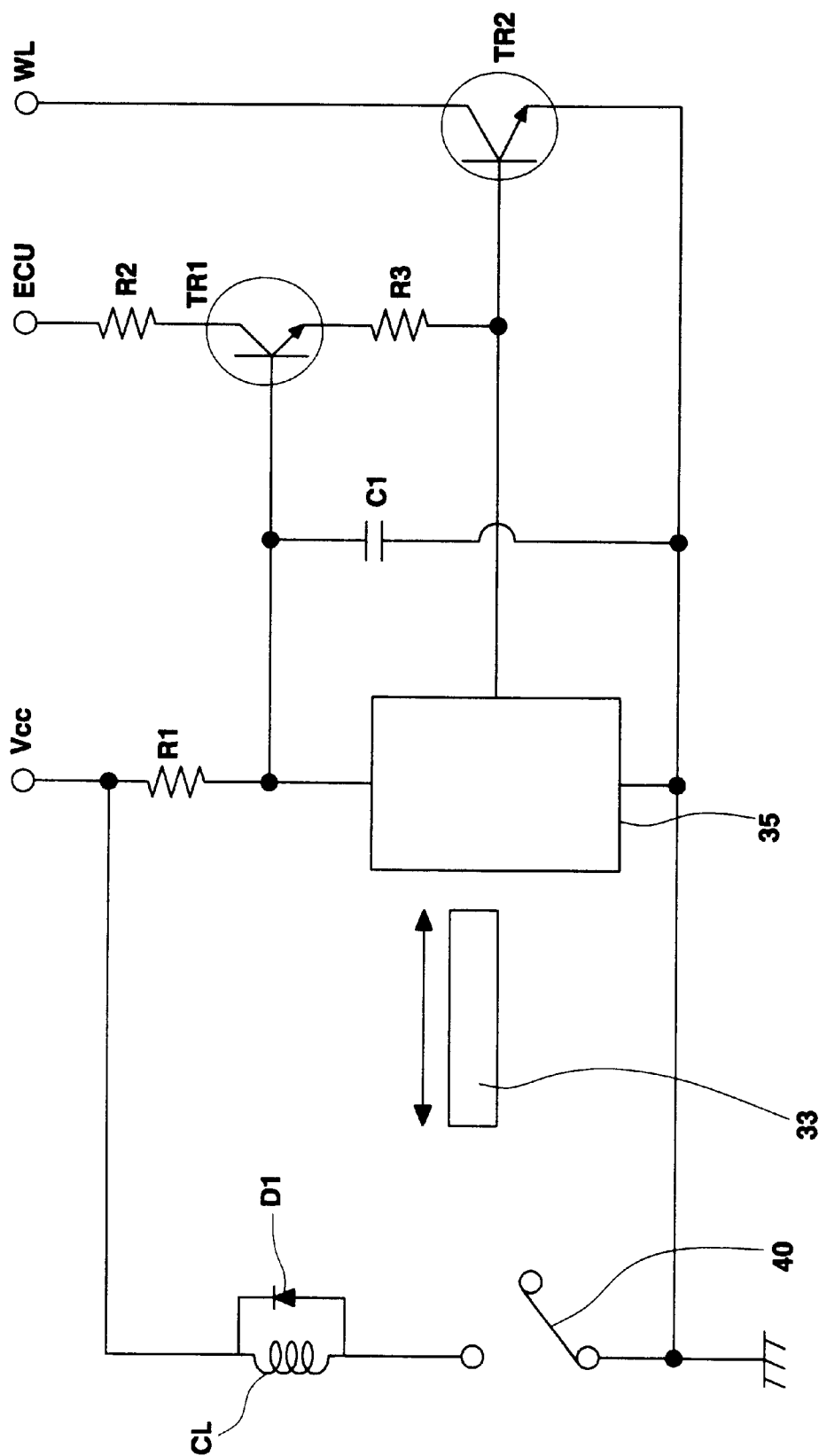
FIG. 5 is a circuit diagram illustrating a locking state detecting apparatus for a buckle, in which the micro-state and the hall sensor assembly are mounted together according to the invention.

Referring to FIG. 5, an example of a buckle locking state detecting apparatus may comprise a control circuit that includes the hall sensor assembly 30 and the micro-switch 40. First, it is noted that an electronic control unit ECU and a warning light WL are operated at a low voltage level, for example below D.C. 5V which is applied to one end of the buckle locking state detecting apparatus.

The electronic control unit ECU is connected through a resistor R2 to the collector of a transistor TR1. The transistor TR1 has an emitter connected through a resistor R3 to the base of a transistor TR2. Transistor TR1 has a base connected through a resistor R1 to a power source VCC. The base of transistor TR1 is also connected through a condenser C1 to the ground. The emitter of transistor TR2 is grounded. The base of transistor TR2 is connected to the hall sensor 35. The collector of transistor TR2 is connected to a warning light WL.

The micro-switch 40 has two ends, one end is connected through a coil CL and a diode D1 (coupled in parallel to each other) to the power source VCC, and the other end is grounded. The hall sensor 35 is connected through the resistor R1 to the power source VCC. The hall sensor 35 has a first terminal that is connected to the condenser C1 and to the base of the transistor TR1. The hall sensor 35 has an output terminal that is connected to the base of the transistor TR2. The hall sensor 35 has a third terminal that is connected to ground.

During the non-locking state of the buckle 1, the buckle locking state detecting apparatus is designed to apply the voltage of the power source VCC through the resistor R1 to the transistors TR1 and TR2. As the transistor TR1 is turned on, the low level voltage applied to the terminal of the electronic control unit ECU turns on the transistor TR2 through the resistor R3. Then one terminal of the warning light WL is connected to groundby the transistor TR2 and the low level voltage applied to the other terminal of the warning light WL causes it to be turned on and indicate the non-fastening state of the seat belt. At that time, the electronic control unit ECU is unable to determine the resistance value of the resistor R3.

In comparison, when the tongue 2 is inserted into the buckle 1, the micro switch 40 is turned off, and the permanent magnet 32 is exposed to directly face the hall sensor 35 through the movement of the slider 33. This causes the hall sensor 35 to be energized. The voltage of the power source VCC is applied through the resistor R1 to turn on the transistor TR1. Since the hall sensor 35 is energized, the low level voltage from the terminal of the electronic control unit ECU is applied through the hall sensor 35 to the ground. At that time, the electronic control unit confirms the resistance value of the resistors R2 and R3, while the transistor TR2 is deactivated so that the warning light WL is turned off.

Figure 6A:
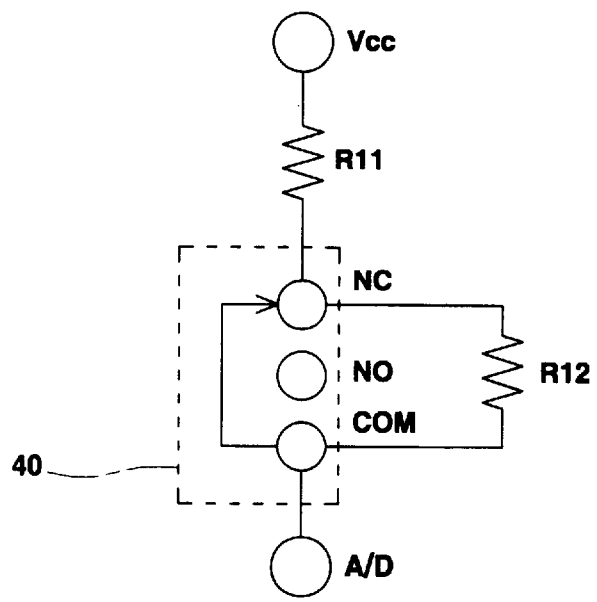
FIGS. 6A and 6B are respectively circuit diagrams illustrating the locking state detecting apparatus of the buckle including the micro-switch according to the invention.
Figure 6B:
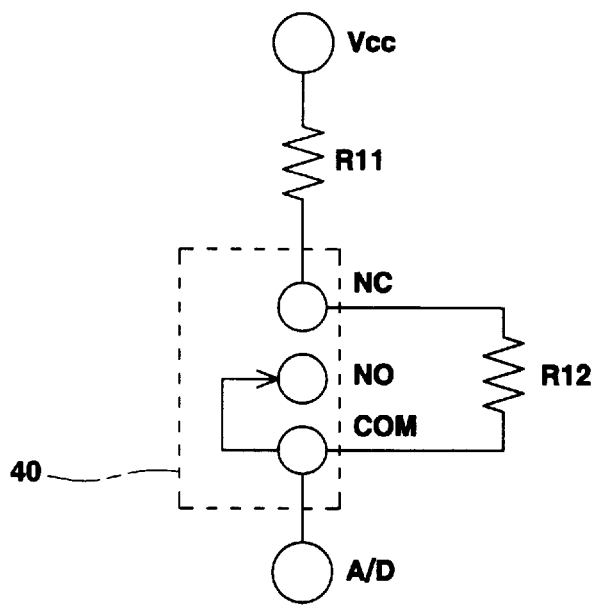

According to another implementation, the micro-switch 40 is a single pole double throw (SPDT) type switch that has one pole and two contacting arms, and has three modes: break, make or operate. The micro-switch 40 may be directly connected to a terminal of the electronic control unit ECU instead of the hall sensor assembly 30, as shown in FIGS. 6A and 6B. The micro-switch 40 has three terminals, including a neutral terminal NO, a control terminal NC, and a common terminal COM. The control terminal NC is connected through a power resistor R11 to the power source VCC. The common terminal COM is connected to the analog/digital terminal A/D of the electronic control unit. A control resistor R12 having a larger resistance value than the resistor R11 is connected between the terminals NC and COM.

The micro-switch 40 is turned on during the non-locking of the buckle 1, so that the control terminal NC and the common terminal COM are connected to the power source VCC. The voltage of the power source VCC is applied through the resistor R11 to the analog/digital terminal A/D. At that time, a high level voltage is applied to the terminal A/D and the electronic control unit recognizes the resistance value of the power resistor R11 alone.

If the buckle 1 is locked, the micro-switch 40 is switched to force the neutral terminal NO to be connected to the common terminal COM, so that the voltage of the power source VCC is applied through the resistors R11 and R12 to the analog/digital terminal A/D thereby to apply a low level voltage to the terminal A/D. At that time, the electronic control unit recognizes the resistance value of both the power resistor R11 and the control resistor R12. Therefore, the micro-switch 40 enables the electronic control unit to detect the locking state of the buckle 1.

Figure 7:
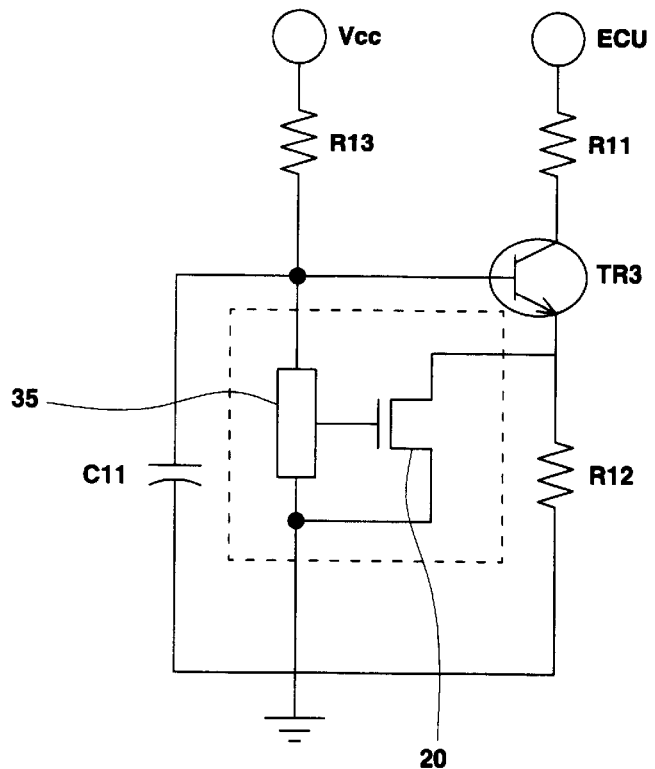
FIG. 7 is a circuit diagram illustrating the locking state detecting apparatus of the buckle including the hall sensor assembly according to another embodiment of the invention.
Figure 8:
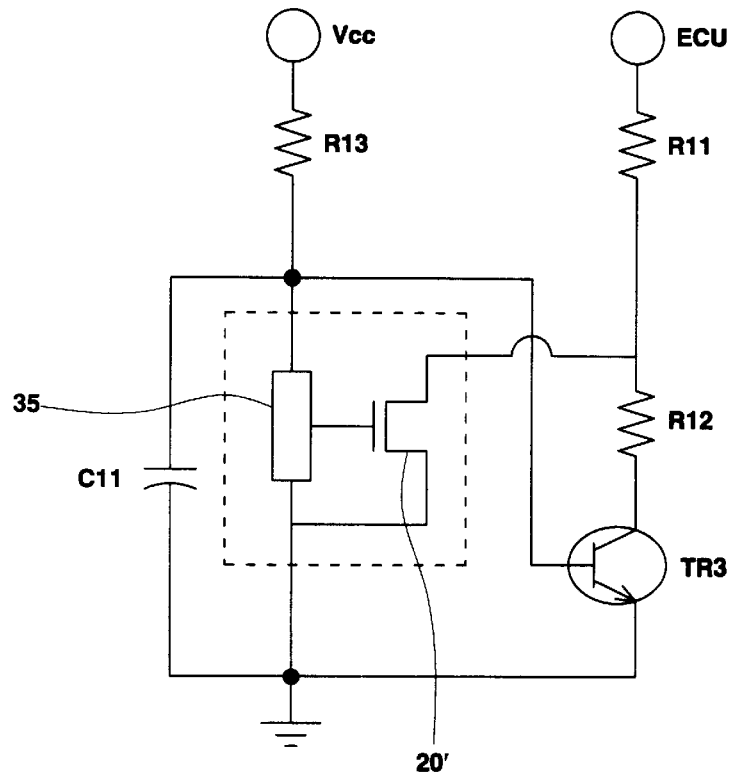
FIG. 8 is a circuit diagram illustrating the locking state detecting apparatus of the buckle including the hall sensor assembly according to another embodiment of the invention.

Referring to FIGS. 7 and 8, other implementations of the invention are illustrated. The hall sensor assembly 30 further includes a FET (Field Effect Transistor) 20 to enhance the reliability of the detecting apparatus.

As shown in FIG. 7, the hall sensor 35 is connected at its output terminal to the gate of the FET 20, at its input terminal through a resistor R13 to the power source VCC and at its third terminal to ground. A transistor TR3 is connected at its base through the resistor R13 to the power source VCC and through a condenser C11 to ground. The collector of the transistor TR3 is connected through a resistor R11 to the electronic control unit ECU and the emitter is grounded through a resistor R12. The FET 20 has a drain that is grounded and a source connected between the emitter of the transistor TR3 and the resistor R12.

On the other hand, as shown in FIG. 8, the FET 20' has a source connected between the resistors R11 and R12. The collector of the transistor TR3 is connected through the resistors R11 and R12 in series to the electronic control unit ECU and the emitter is grounded.

The two implementations shown in FIGS. 7 and 8 have similar operating principles. In both implementations, the locking state detecting circuit is enabled to generate a detecting signal indicating the buckle locking state, and to provide the detecting signal to the terminal of the electronic control unit ECU.

If the buckle is not in the locking state, the hall sensor 35 is shielded from the permanent magnet 32 and deenergized. The voltage of the power source VCC is applied through the resistor R13 to trigger the transistor TR3. The electronic control unit ECU reads the voltage value formed by the resistors R11 and R12 as shown in FIGS. 7 and 8. The electronic control unit ECU does not detect a locking state of the buckle because a low level voltage is applied to its terminal.

If the buckle is in the locking state, the hall sensor 35 is energized to trigger the gate of the FET 20 or 20', so that its drain and source are excited. In this situation, the electronic control unit recognizes only the resistance value of the power resistor R11, whereby a high level voltage is applied to the terminal of the electronic control unit ECU, resulting in detecting the locking state of the buckle 1.

As described above, a buckle locking state detecting apparatus enables the electronic control unit to scan the voltage value formed by resistors connected thereto according to the locking or non-locking of a buckle. This provides a more stable and reliable method of detecting the locking state of the buckle. Also, other types of sensors, such as optical sensors, can be used to enhance the reliability of the buckle locking state detecting apparatus.

What is claimed is:

1. An apparatus comprising:
    a hall sensor mounted in a seatbelt buckle;
    a first electronic switching device that is electrically coupled to a first terminal of the hall sensor; and
    a second electronic switching device that is electrically coupled to a second terminal of the hall sensor.

2. The apparatus of claim 1 in which the first electronic switching device has a first terminal and a second terminal, the first terminal being electrically coupled to a first terminal of a first resistor, the second terminal being electrically coupled to a first terminal of a second resistor.

3. The apparatus of claim 2 in which the second electronic switching device comprises a first terminal and a second terminal,
    the first terminal of the second electronic switching device being electrically coupled to the second terminal of the first electronic switching device, and
    the second terminal of the second electronic switching device being electrically coupled to ground.

4. The apparatus of claim 2 in which the second electronic switching device comprises a first terminal and a second terminal,
    the first terminal of the second electronic switching device being electrically coupled to the second resistor, and
    the second terminal of the second electronic switching device being electrically coupled to ground.

5. The apparatus of claim 2, further comprising an electronic control unit of a vehicle that is electrically coupled to a second terminal of the first resistor.

6. The apparatus of claim 5 in which a second terminal of the second resistor is electrically coupled to ground.

7. The apparatus of claim 5 in which the hall sensor, the first electronic switching device, and the second electronic switching device are configured so that a voltage at the second terminal of the first resistor changes in response to a change in an output of the hall sensor.

8. The apparatus of claim 1 in which the second electronic switching device comprises a field effect transistor (FET).

* * * * *